Feb. 25, 1941.   W. T. CALDWELL   2,232,997
CLEVIS
Filed Jan. 27, 1939   2 Sheets-Sheet 1

INVENTOR
Walter T. Caldwell
BY
Arthur C. Brown
ATTORNEY

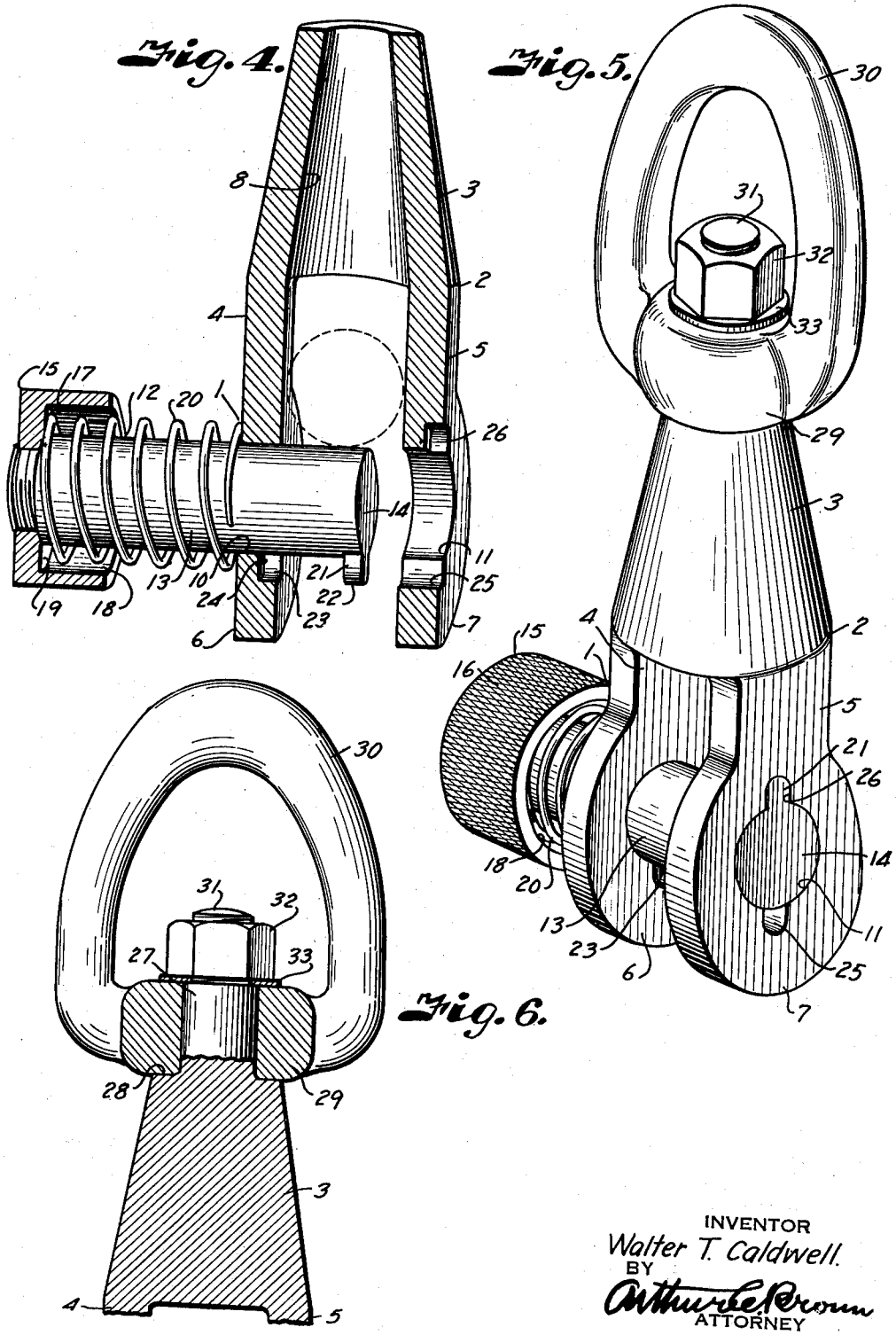

Patented Feb. 25, 1941

2,232,997

UNITED STATES PATENT OFFICE 2,232,997

CLEVIS

Walter T. Caldwell, Enid, Okla., assignor to George E. Failing Supply Company, Enid, Okla., a corporation of Oklahoma Application January 27, 1939, Serial No. 253,148

2 Claims. (Cl. 287—100)

This invention relates to clevises, particularly those of safety type adapted for connecting and disconnecting loads from an operating mechanism such as a drilling string and its tackle mechanism, and has for its principal object to provide a clevis of this character which is of strong, simple construction and adapted to be easily and quickly operated.

Other objects of the invention are to provide a clevis with a pin having locking features which may be safely operated by workmen while wearing gloves and which is not likely to be accidently released by fouling of the equipment with an obstruction; and to provide a clevis constructed to give all the advantages of a conventional safety hook, but which is of lighter weight and of stronger construction.

In accomplishing these and other objects of the invention, as hereinafter described, I have provided improved details of structure, the preferred forms of which are illustrated in the accompanying drawings, wherein:

Fig. 3 is a similar view showing the pin completely withdrawn to effect connection of the clevis with the bail of a swivel, or the like.

Fig. 4 is a perspective sectional view through the clevis showing the pin partly withdrawn from supporting relation with a bail, the bail being shown in dotted lines.

Fig. 5 is a perspective view of a swivel clevis constructed in accordance with the present invention.

Fig. 6 is a sectional view through the head of the swivel-clevis illustrated in Fig. 5.

Figure 1:
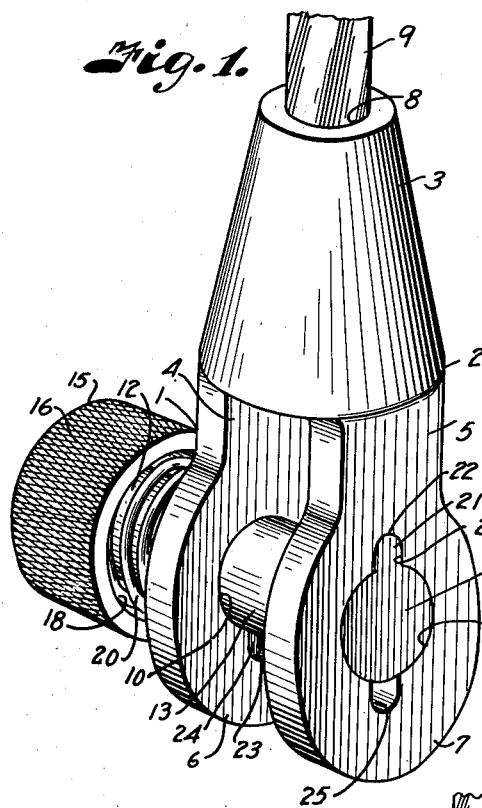
Fig. 1 is a perspective view of a rope socket clevis embodying the features of the present invention and showing the clevis pin in latched position.
Figure 2:
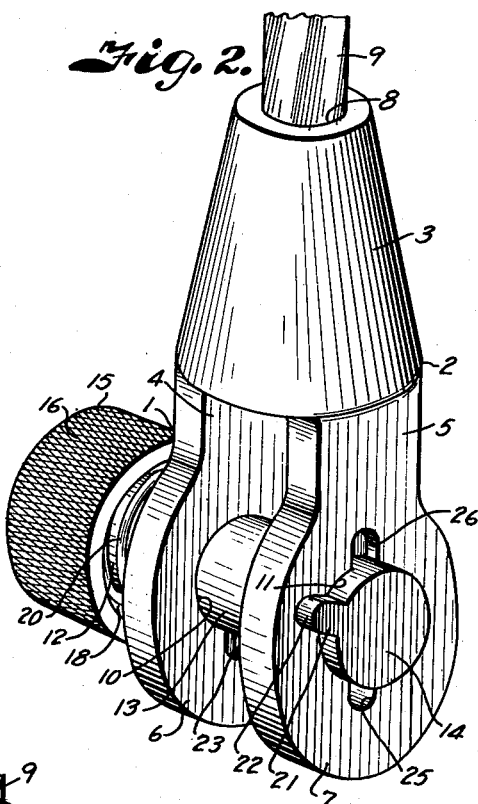
Fig. 2 is a similar view showing the pin being moved to unlatched position.
Figure 3:
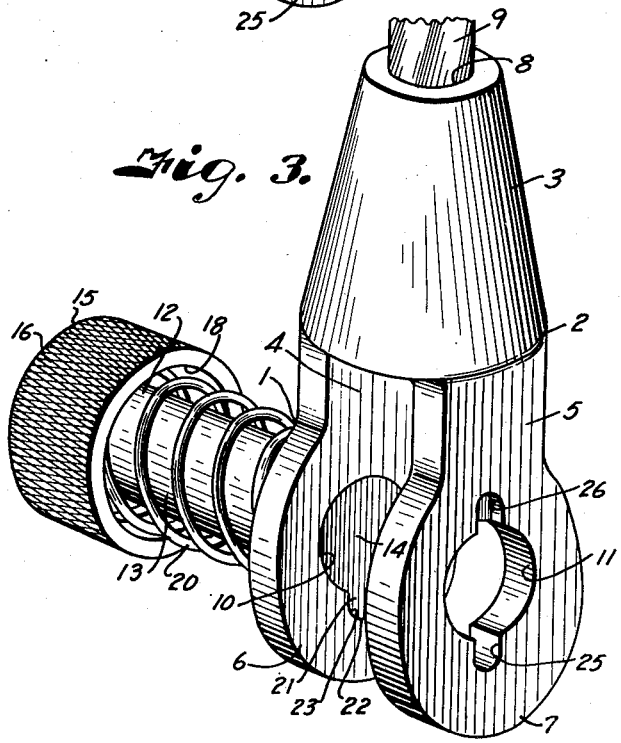

Referring first to Figs. 1 to 4 inclusive of the drawings:

1 designates a clevis constructed in accordance with the present invention, and which includes a stirrup 2 having a substantially truncated, cone-shaped head 3 and spaced straps 4 and 5, integrally connected with the base of the head and terminating in substantially circular ears 6 and 7. The head 3 has an inner conical bore 8 (Fig. 4), in which the splayed end of a cable 9 is anchored by babbitting or the like, as in conventional practice. The ears 6 and 7 have axially aligned circular openings 10 and 11 to accommodate a clevis pin 12.

The pin 12 includes a cylindrical body 13 projectable through the openings 10 and 11 and adapted for rotation therein. The pin 12 is of sufficient length to project from one of the ears when the flat end face 14 thereof aligns with the outer face of the other ear, as shown in Fig. 1. Fixed to the projecting end of the pin is a knob-like handle 15, preferably knurled as at 16 to facilitate grip thereon when rotating and withdrawing the pin, as later described. The knob 15 has a recess 17 on its inner side of larger diameter than the pin to provide an annular socket 18, the bottom 19 of which seats one end of a compression spring 20 that is sleeved over the pin and has its opposite end engaging the outer face of the ear 6 to normally effect withdrawal of the pin from the opening 11 in the ear 7.

The opposite end of the pin has a radially extending latch lug 21 rounded on the outer end, as at 22. When the pin is withdrawn from engagement with the ear 7 of the strap 5 to allow entrance and withdrawal of the bail or the like, the lug 21 is received in a latching socket 23, formed in the inner face of the ear 6 on the side of the opening opposite the stirrup head 3. The socket 23 is of sufficient depth so that when the lug 21 strikes the bottom 24 thereof the flat end face 14 of the pin will have substantially registered with the inner face of the ear to avoid interference with insertion and removal of the bail and at the same time prevent complete withdrawal of the pin.

Formed in the other ear 7, in alignment with the socket 23, is a groove 25 of sufficient size to pass the lug 21 when the pin is projected across the space between the straps of the stirrup in retaining the bail. In order to lock the pin in bail retaining position, the outer face of the ear 7 is provided with a socket 26, similar to the socket 23 and which is adapted to seat the lug when the pin has been rotated sufficiently to register the lug therewith. At the time the pin is projected into the opening 11, the spring 20 is compressed and the expanding action automatically seats the latch lug in the socket 26 when registry occurs.

The latching socket 26 is preferably located diametrically opposite the groove 25 so that should the knob of the pin be accidently engaged with an obstruction that tends to compress the spring 20, it is not likely to rotate sufficiently to register the lug with the groove 25.

The form of the invention shown in Fig. 6 is identical with that illustrated in Figs. 1 to 4 inclusive, with the exception that the head of the stirrup has a stud 27 forming an annular shoulder 28 therewith to receive the swivel ring 29 of an eye 30. The stud 27 has a reduced threaded shank 31 to mount a retaining nut 32 which secures the eye to the stirrup of the clevis, a suitable antifriction bearing or washer 33 being inserted between the swivel ring and the nut, as best shown in Fig. 6.

In using a clevis constructed and assembled as described, and assuming that the pin is withdrawn so that the lug 21 is engaged within the socket 23, the space between the straps of the stirrup is then clear to permit ready passage of a bail, link, or the like, the space above the pin being sufficient to provide ample clearance of the pin with the bail so that when the operator presses against the knob 15 to compress the spring the pin is readily projected under the bail and through the opening in the ear 7 with the lug passing through the groove 25. When the pin clears the outer face of the ear 7 the knob is rotated until the lug aligns with the socket 26. Release of the knob then allows the stored up tension of the spring to draw the lug into latching engagement with the socket. When the lug is thus engaged the pin is securely retained and is not likely to be disengaged incidental to fouling of the equipment or striking of the pin against an obstruction or the like.

To release the bail from the clevis, the spring is again compressed to effect disengagement of the lug with the socket 26, whereupon the knob is rotated to bring the lug into registry with the groove 25. The pin may then be withdrawn from the ear 7 with the lug in depending position as shown in Fig. 4, until it is stopped by engagement of the lug with the bottom of the socket 23. The lug 21, being turned away from the direction of the bail, does not interfere with withdrawal of the pin as would be the case if the arrangement of the groove 25 and socket 26 were reversed.

From the foregoing it is obvious that I have provided a safety clevis which is of simple and inexpensive construction and which may be readily operated to effect connection and disconnection thereof and that when the pin is in latched position, it is securely retained.

What I claim and desire to secure by Letters Patent is:

1. A device of the character described including a stirrup having a head provided with spaced strap portions having aligning openings and a lug receiving recess extending into one of said strap portions from the inside face thereof and intersecting the opening therein, a pin slidably rotatable in said openings, a lug on the end of the pin at the recess side of said strap portion, a knob on the other end of the pin, and a coil spring on the pin having one end engaging said knob and the other end the outer face of the strap portion having the recess to urge the lug into said recess whereby the pin and lug are retracted clear of the inside face of said strap portion to leave the space between said strap portions free of obstructions, said other strap portion having a groove intersecting a side of the opening therein at a point opposite said head to pass the lug therethrough when the pin is projected through said opening and having a socket offset from said groove and substantially conforming to the shape of the lug to receive said lug when the pin is rotated to position the lug in registry with said socket whereby the lug is retained in said socket by the spring to prevent rotation of the pin.

2. A device of the character described including a stirrup having a head provided with spaced strap portions having aligning openings and a lug receiving recess on the inside face of one of said strap portions and intersecting the opening therein at the side opposite said head, a pin slidably rotatable in said openings, a lug on the end of the pin at the recess side of said strap portion, a knob on the other end of the pin, and a coil spring on the pin having one end engaging said knob and the other end the outer face of the strap portion having the recess to urge the lug into said recess whereby the pin and lug are retracted clear of the inner face of said strap portion to leave the space between said strap portions free of obstructions, said other strap portion having a groove intersecting a side of the opening therein at a point opposite said head and in registry with said recess to pass the lug therethrough when the pin is projected through said opening and having a socket offset from said groove and substantially conforming to the shape of the lug to receive said lug when the pin is rotated to position the lug in registry with said socket whereby the lug is retained in said socket by the spring to prevent rotation of the pin.

WALTER T. CALDWELL.